United States Patent
Trossell et al.

(10) Patent No.: US 7,251,248 B2
(45) Date of Patent: Jul. 31, 2007

(54) CONNECTION DEVICE

(75) Inventors: David Paul Trossell, Lymington (GB); Christopher Gearing, Bristol (GB)

(73) Assignee: Bridgeworks Ltd., Hampshire (GB)

( * ) Notice: Subject to any disclaimer, the term of this patent is extended or adjusted under 35 U.S.C. 154(b) by 1022 days.

(21) Appl. No.: 10/208,359

(22) Filed: Jul. 30, 2002

(65) Prior Publication Data
US 2003/0027465 A1     Feb. 6, 2003

Related U.S. Application Data

(60) Provisional application No. 60/326,562, filed on Oct. 2, 2001.

(30) Foreign Application Priority Data
Jul. 31, 2001    (GB)    ................ 0118646.9

(51) Int. Cl.
H04L 12/46    (2006.01)
H04L 12/66    (2006.01)
H04L 29/06    (2006.01)
G06F 13/14    (2006.01)
G06F 13/38    (2006.01)

(52) U.S. Cl. .............. 370/401; 370/419; 370/463; 370/465; 710/105; 710/129; 719/321; 719/328

(58) Field of Classification Search .............. 370/401, 370/419, 463, 465; 710/105, 129; 719/321, 719/328
See application file for complete search history.

(56) References Cited

U.S. PATENT DOCUMENTS

| 5,680,552 | A | * | 10/1997 | Netravali et al. ........... 709/250 |
| 5,953,340 | A | * | 9/1999 | Scott et al. ................. 370/401 |
| 6,021,454 | A | | 2/2000 | Gibson |
| 6,065,087 | A | | 5/2000 | Keaveny et al. ............ 710/129 |
| 6,108,345 | A | * | 8/2000 | Zhang ........................ 370/445 |
| 6,111,893 | A | * | 8/2000 | Volftsun et al. ............ 370/466 |
| 6,151,390 | A | * | 11/2000 | Volftsun et al. ............ 379/229 |
| 6,278,697 | B1 | * | 8/2001 | Brody et al. ................ 370/310 |
| 6,400,729 | B1 | * | 6/2002 | Shimadoi et al. .......... 370/466 |
| 6,470,028 | B1 | * | 10/2002 | Perry et al. ................ 370/466 |

(Continued)

FOREIGN PATENT DOCUMENTS

EP    0 727 909 A2    8/1996

(Continued)

OTHER PUBLICATIONS

European Search Report for application No. EP02255324, Dec. 1, 2003.

*Primary Examiner*—Alpus H. Hsu
(74) *Attorney, Agent, or Firm*—Wilmer Cutler Pickering Hale and Dorr LLP (57) ABSTRACT

A connection device comprises a first physical device, a first device driver layer, a first interface abstraction layer, in which is embedded a first software support layer, a data core, a second interface abstraction layer, in which is embedded a second software support layer, a second device driver layer and a second physical device. A command and control module is connected to each of the physical devices and to the data core. Data and commands passing from the first device driver layer to the data core are removed of protocol-dependent information.

13 Claims, 5 Drawing Sheets

U.S. PATENT DOCUMENTS

| | | | |
|---|---|---|---|
| 6,650,632 B1 * | 11/2003 | Volftsun et al. | 370/352 |
| 6,678,535 B1 * | 1/2004 | Narayanaswami | 455/557 |
| 6,741,610 B1 * | 5/2004 | Volftsun et al. | 370/466 |
| 6,826,762 B2 * | 11/2004 | Shell et al. | 719/328 |
| 6,901,420 B2 * | 5/2005 | Lin et al. | 708/209 |
| 6,940,870 B2 * | 9/2005 | Hamlin | 370/466 |
| 6,959,439 B1 * | 10/2005 | Boike | 719/326 |
| 6,976,075 B2 * | 12/2005 | Ma | 709/228 |
| 7,159,010 B2 * | 1/2007 | Harbin et al. | 709/207 |
| 2002/0181497 A1 * | 12/2002 | Mano et al. | 370/466 |
| 2003/0023709 A1 * | 1/2003 | Alvarez et al. | 709/223 |

FOREIGN PATENT DOCUMENTS

| | | |
|---|---|---|
| EP | 0921659 | 6/1999 |
| GB | 2 372 679 A | 8/2002 |
| WO | WO 99/34297 | 7/1999 |
| WO | 01/06385 | 1/2001 |
| WO | WO 02/23364 A1 | 3/2002 |

\* cited by examiner

CONNECTION DEVICE

FIELD OF THE INVENTION

This invention relates to device for connecting two or more devices via interfaces conforming to one or more connectivity standards.

SUMMARY OF THE INVENTION

According to a first aspect of the invention, there is provided a device for connecting two or more devices via interfaces conforming to one or more connection standards, the device comprising a plurality of modules connected in series between two of the interfaces, each of the modules being arranged to operate in such a way that the nature of outputs of the module needs to be taken into account only by the module immediately succeeding it.

The modules may comprise, in series: a first interface conforming to one or more connection protocols; first conversion means arranged to receive data, conforming to the or each connection protocol, from the first interface, and to output protocol-free data; a data core for storing the protocol-free data; a second conversion means arranged to receive the protocol-free data from the data core; and a second interface conforming to one or more connection protocols, the second conversion means also being arranged to convert the protocol-free data to protocol-dependent data such that it can be received by the second interface. The first and second interfaces may each comprise programmable means for storing information defining the or each connection protocol to which that respective interface conforms. The programmable means can be updated to cater for any new or different protocol driver which is to be implemented by the connection device. This minimises the need for redesigning or modifying the connection device to cater for a different or new driver protocol.

Although first and second interfaces are defined, the connection device can comprise additional interfaces, additional respective conversion means being provided between each additional interface and the data core.

According to a second aspect of the invention, there is provided a device for connecting a plurality of data devices, the connection device comprising: a plurality of connection interfaces conforming to one or more connection protocols and arranged to have a data device connected thereto; a data core including a memory; and, interposed between each connection interface and the data core, conversion means arranged to receive data, conforming to the or each connection protocol, from its respective connection interface and to output protocol-free data to the data core memory.

The term "data" is used in its broadest sense, it should be appreciated that such data can be comprised of both command information and data on which the command is to be performed.

Each conversion means may be further arranged to receive protocol-free data from the data core memory, and to output converted data to the connection interface associated with the conversion means, the converted data conforming to the or each connection protocol to which the connection interface conforms.

Preferably, each connection interface comprises programmable means for defining the or each connection protocol to which the connection interface conforms.

In use, the device may be operable such that, after protocol-free data is stored in the data core memory, the device is arranged to generate one or more pointers referencing an up-to-date address where the data is stored, the or each pointer being accessible to data devices connected to the or each connection interface such that the protocol-free data can be identified and read by the data devices, via the conversion means associated with the connection interface. It will be appreciated that the use of one or more up-to-date pointers enables the protocol-free data to be referenced and read by data devices (via a connection interface and conversion means) without actually modifying the data stored in the data core. This enables multiple data devices to access the protocol-free data in an efficient way.

The device may also be operable to generate a status register (or a 'transaction status register') defining an up-to-date status of a processing operation being performed on protocol-free data stored in the data core memory. Although the term 'status register' is used, it will be appreciated that this is likely to comprise a plurality of registers. For example, if data received from a data device includes command information relating to a "write" operation, the status register can include information identifying initiator and target devices and the type of command (a "write"). The device may also be operable to generate a pointer to the status register, the status register pointer being accessible to data devices connected to the or each connection interface such that the status register can be updated by data devices connected to the or each connection interface after a processing operation is performed.

The device may be further operable to allocate a memory area in the data core in response to an error message, relating to a data processing operation, being received from a data device, the memory area being used hold status data relating to the error message for subsequent transmission to one or more further data devices. Thus, if a "write" operation is desired from an initiator device to a target device, and for some reason there is a discrepancy in the operation, the target device may wish to pass back an error message in the form of status data. In this case, the device is arranged to allocate an area of memory for storing the status data forming the error message. This can then be transmitted to one or more other data devices, e.g. the initiator device. In addition, the status register (mentioned above) can be updated to reflect the presence of the error message. This automatic creation of status data need not be confined to error messages, and there may be circumstances where a target device wishes to communicate some other form of status data back to the initiator device.

Preferably, each conversion means can comprise software support means for effecting manipulation of the protocol free data in the data core memory in response to a data manipulation command being included in data received from a data device. This may comprise a software support layer which allows data manipulation operations, such as data conversion, encryption, or padding, to be performed.

The connection interfaces can be comprised by any protocol driver, including any one or more of a SCSI driver, an ISCSI driver, a Fibre Channel driver, an ATM driver, an Infiniband driver, or a Gb Ethernet driver.

A connection device module can also be provided, comprising a printed circuit board upon which is arranged: a connection device having any of the above-described features, and a physical connector connected to each interface of the connection device.

According to a third aspect of the invention, there is provided a data interfacing method comprising: receiving data, conforming to one or more connection protocols, from a connection interface conforming to the one or more connection protocols; in a conversion means, identifying and removing protocol-dependent information from the data thereby to generate protocol-free data; and storing the protocol-free data in a data core memory, the protocol-free data being accessible by one or more data devices via a conversion means and connection interface associated with the one or more data devices.

According to a fourth aspect of the invention, there is provided a device for connecting two or more devices via interfaces, the device comprising in series: a first device driver module, which conforms to a first connection standard and which is arranged to operate with a first one of the interfaces and to provide a data and command output in response to data received at the first interface; an abstraction layer, which receives the data from the first device driver and provides protocol-free data and commands in response thereto; a data core which is arranged to receive the protocol-free data and commands and to provide data and commands in response thereto; a second abstraction layer, which is arranged to receive the data and commands from the data core and to provide protocol-containing data and commands in response thereto; and a second device driver module, which conforms to a second connection standard and which is arranged to receive the protocol-containing data and commands and to operate with a second one of the interfaces to provide data and commands conforming to the second connection standard thereat.

Preferably, each abstraction layer can comprise software support means (or a software support layer) for effecting manipulation of the protocol free data in the data core memory in response to a data manipulation command being included in data received from a data device.

BRIEF DESCRIPTION OF THE DRAWINGS

Embodiments of the invention will now be described, by way of example only, with reference to the accompanying drawings, of which.

DETAILED DESCRIPTION OF A PREFERRED EMBODIMENT

Figure 1:
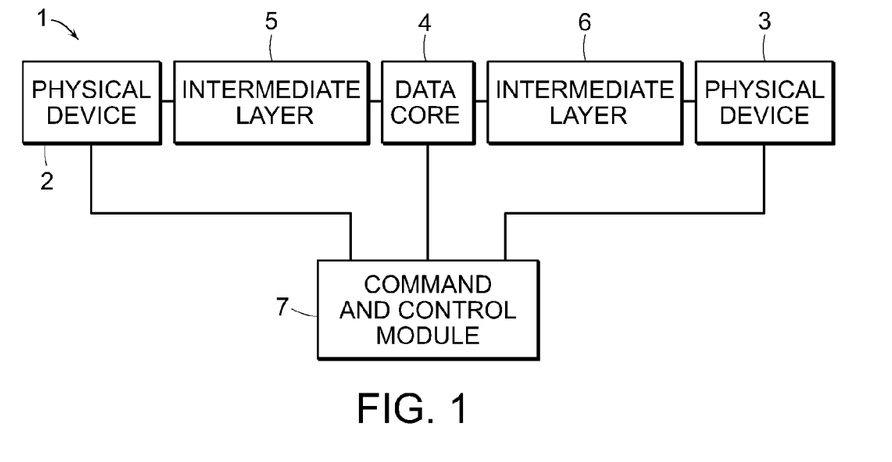
FIG. 1 is a schematic diagram representing functional blocks in a generalised connection device according to the invention.

Referring to FIG. 1, which is a generalised block diagram of a connection device 1, the connection device 1 comprises first and second interfaces 2, 3 arranged to be connected to data connectors (not shown) which, in operation, transfer commands and/or data according to one of a number of data protocols, e.g. SCSI or Fibre Channel. A data core 4 is also provided, the data core being arranged to store the commands and/or data in protocol-independent form. In other words, the data core 4 is arranged to store 'raw' versions of the data and/or commands received from one or both of the interfaces 2, 3, the raw data and/or commands having been removed of their protocol-related information. Located between the first and second interfaces 2, 3 and the data core 4 are, respectively, first and second intermediate layers 5, 6. It is a function of the first and second intermediate layers 5, 6 to identify and remove the protocol-related information from data and/or commands being transferred to the data core 4, and to add protocol-related information to data being transferred from the data core to the or each of the first and second interfaces 2, 3. A command and control module 7 is connected to the first and second physical devices 2, 3 and to the data core 4. The command and control module 7 is arranged to perform general data processing and control operations.

Although only first and second interfaces 2, 3 are shown, since the data core 4 can store protocol-independent commands and/or data, the commands and/or data can be accessed by, in theory, any number of external devices via interfaces conforming to any chosen data transfer protocol. This is so because the protocol-related information required by such interfaces, is added by an appropriately-configured intermediate layer when the commands and/or data are taken from the data core 4. When an external device conforming to a different or new protocol is required to operate with the connection device 1, all that is effectively required is reprogramming of the interfaces 2, 3, or the addition of a new interface.

The connection device 1 is operable such that processing operations performed over the connection device 1, such as 'write' and 'read' operations, can be performed without moving commands and/or data within the data core 4. Once a command and/or data is stored in the data core 4, the connection device is arranged to generate a pointer to the storage location of each command and/or data block, and to maintain a status record of the or each operation being performed. By passing the storage location pointers and the status record pointer, many data processing operations can be performed without any manipulation, movement, or copying of the commands and/or data within the connection device 1. This provides particular advantages in terms of scalability since any number of external devices can connect to the connection device 1 and access or add data and/or commands without causing corruption of data for other external devices. Data processing is also fast and efficient.

Having provided an overview of the generalised connection device 1, more specific examples will now be described.

Figure 2:
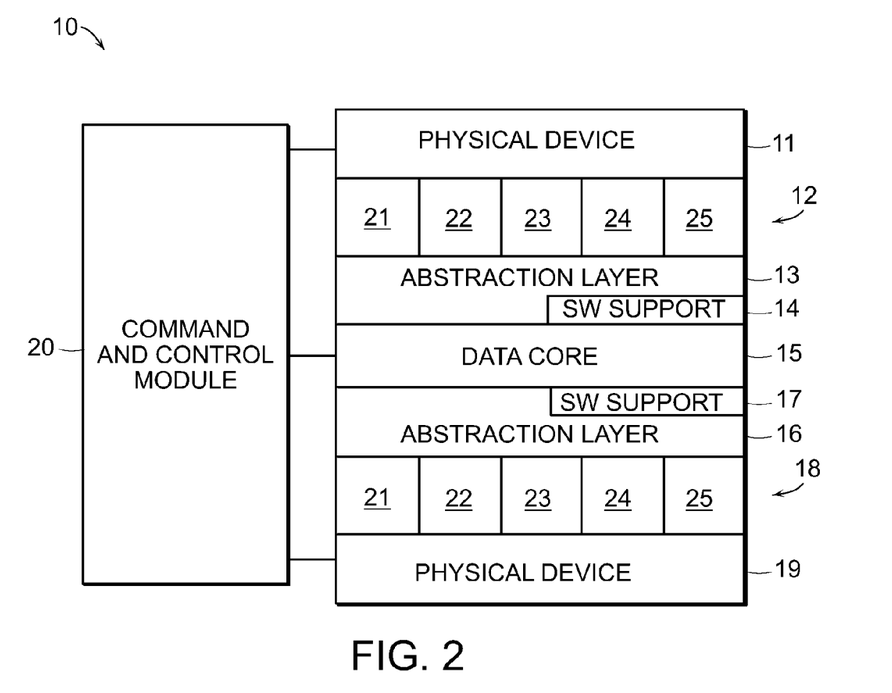
FIG. 2 is a schematic diagram of the architecture of a connection device according to the invention.

Referring to FIG. 2, an architecture of a connection device 10 is shown comprising generally a first physical device 11, a first device driver layer 12, a first interface abstraction layer 13, in which is embedded a first software support layer 14, a data core 15, a second interface abstraction layer 16, in which is embedded a second software support layer 17, a second device driver layer 18 and a second physical device 19. A command and control module 20 is connected to each of the physical devices 11, 19 and to the data core 15. The connection device 10 is thus formed of a number of modules which, due to certain of the below described features, is of particular design simplicity.

The function of the data core 15 is to manage data manipulation and other data management tasks. All commands and data which reside in the data core 15 are protocol free, which allows it to present a protocol free data and command interface to the interface abstraction layers 13, 16. The data core 15 is central to the operation of the connection device 10. As well as providing memory space, the data core 15 initialises and tests the connection device 10 on boot-up, and it configures the relevant components of the connection device following detection of the input/output interfaces after boot-up. The data core 15 controls all actions and processes that takes place in the connection device 10, and maintains and updates a log of all processes running within the connection device, as well as other events such as interrupts and error conditions. The data core 15 also routes data between different input/output interfaces, if these are present. The An advantageous feature of the connection device architecture is that the data core 15 is designed using standard components in such a way as to be expandable in terms of performance, functionality and memory capacity with little redesigning being required. The architecture can be laid out on a printed circuit board over a relatively small area, and as will be fully explained below, the architecture offers particular advantages in terms of its scalability.

The interface abstraction layers 13, 16 are identical, so will be described together here. Each of the layers 13, 16 has the role of providing a device independent, yet consistent interface to the data core 15 from the device drivers forming the device driver layers 12, 18, whilst providing a flexible interface from the data core to the device drivers to support the various interface protocols and hardware which may be present. The layers 13, 16 are arranged to manage routing information associated with data transfers, and may also provide data formatting if this is required. The software support layers 14, 16 provide support for such data formatting, and also provide support for any data manipulation carried out by the data core 15. It will be understood one of the main functions of the interface abstraction layers 12, 18 is to 'strip-out' protocol-dependant information from data passed from the device driver layers 12, 18 and to pass the raw data and commands to the data core 15 where the raw data is stored.

The device driver layers 12, 17 each comprise at least one connection standard specific device driver module. These are shown in FIG. 1 as plural modules, namely a SCSI driver 21, a Fibre Channel driver 22, an ATM driver 23, an Infiniband driver 24 and a Gb Ethernet driver 25, connected in parallel. Further device driver modules (not shown) conforming to other connection standards may also be present. For example, a driver for the increasingly popular Internet based SCSI driver (ISCSI) could be provided. The device driver layers 12, 17 are represented as being identical, although this is unlikely to be the case in any end product. Each of the device driver modules 21 to 25 is divided into a protocol layer, which manages the interface from the interface abstraction layers 13, 16 and formats command and data requests therefrom into the format required for the protocol with which it is concerned; and a hardware dependency layer, which forms an interface between the protocol layer and the physical devices 11, 19, and controls the integrated circuits of the latter. The hardware dependency layer makes a significant contribution to allowing the modules 13–17 to be independent of the devices (not shown) with which the connection device is used. It allows different physical devices conforming to the same standard to be used in the connection device 10 with reprogramming only of the hardware dependency layer.

Each of the device driver modules 21–25 perform the following functions: the queue management of data transfer and protocol commands; the management of protocol specific interface initialisation commands; the management of low-level protocol responses, protocol handshaking and protocol errors; the management and definition of routing information for data transfers. The hardware dependency layers also provide an interface between the physical devices 11, 18 and their respective protocol layer. The device drivers 21–25 manage data transfer from I/O controllers of the physical devices 11, 18 to the interface abstraction layers 13, 16.

The physical devices 11, 19 each include at least one input/output (I/O) controller (not shown). At least one I/O controller is connected to each of the device driver modules 21–25. Two or more I/O controllers may be connected to a single device driver module, if two interfaces of the connection type of that device driver module are required on that side of the data core 15.

It will be appreciated that the configuration and operation of each module is dependent only on the module or modules which are connected directly to it. This allows for a flexible design platform, into which new connectivity standards can easily be incorporated and with minimum redesign. It also allows connection devices to be designed and built relatively quickly and at low cost from what amounts to a toolbox of hardware and software modules.

Figure 3:
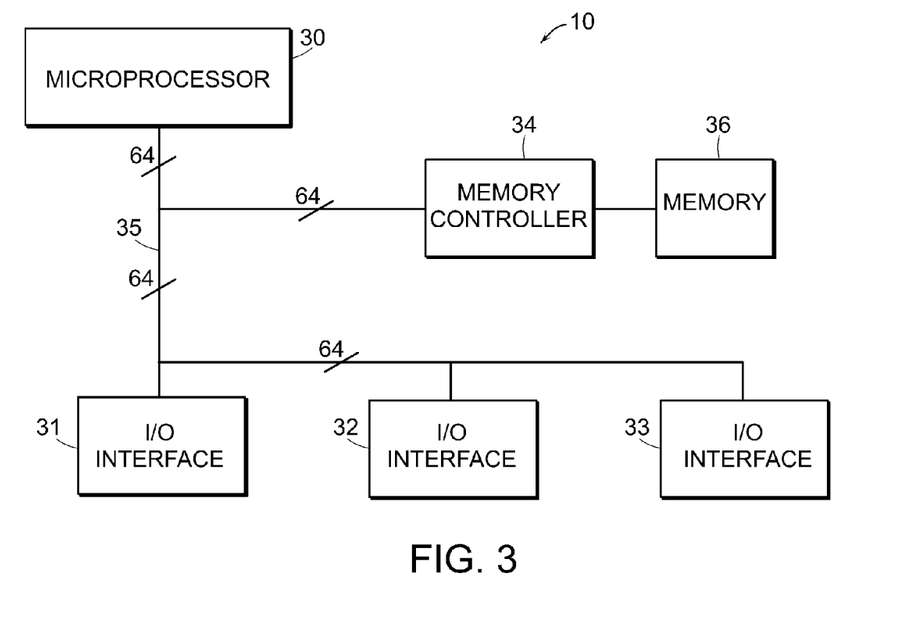
FIG. 3 is a schematic diagram typically representing the arrangement of components in a connection device implementing the architecture shown in FIG. 2.

An example of a typical circuit layout which implements the architecture of the connection device 10 is shown in FIG. 3, where the modules 11 to 20 are not indicated. The connection device comprises a microprocessor 30, which is connected to first to third input/output interfaces 31–33 and to a memory controller 34 via a PCI bus 35. Other bus technologies can be used. Such a bus 35 may operate at a variety of data rates and data path widths. For example, a 64 bit 133 MHz bus can be used, having a data rate of 1 GB/second. Alternatively, a 32 bit 66 MHz bus can be used with a slower data rate, e.g. 264 MB/second. A memory 36 is accessible by the microprocessor 31 only via the memory controller 34. Typically, a physical connector (not shown) will be connected to each of the first to third input/output interfaces 31–33 for allowing connection to an appropriate external device. Thus, the physical device layers 11, 19, represented in FIG. 2, are each made up of a suitable physical connector and one of the input/output interfaces 31–33.

In terms of implementing the architecture of FIG. 2 in hardware, the command and control module 20 can be a combination of both hardware and software, whereas the device driver layer 12, 18 and the abstraction layer 13, 16 (including the software support layer 14, 17) can be implemented in software alone. The data core 15 is likely to be implemented in hardware. Alternative arrangements are possible.

The circuit elements shown in FIG. 3, and the physical connectors (not shown), may be implemented on a single printed circuit board.

The microprocessor 30, memory controller 34 and memory 36 handle the operations of the command and control module 20, as well as the device driver layer 12, 18 and the abstraction layer 13, 16. The data core 15 is implemented by the memory 36. As mentioned above, each physical device layer 11, 13 is implemented by one of the input/output interfaces 31–33 together with an associated physical connector (not shown).

Any alteration required in the connection device 10 that needs to be catered for, e.g. the provision of a new device driver module conforming to a new protocol, simply requires the replacement and/or reprogramming of the device driver module in the layer 12 or 18 and in the physical input/output interface 31, 32, 33. No redesign or rearrangement of the overall architecture is required and no changes need to be made to the data core 15 which is, of course, protocol independent.

Simple data 'write' and 'read' operations will now be described with reference to FIGS. 4 to 6, these being typical examples of data transfer operations which may be performed between devices connected using the connection device 10. Modules shown in FIGS. 2 and 3 will also be referred to.

Figure 4:
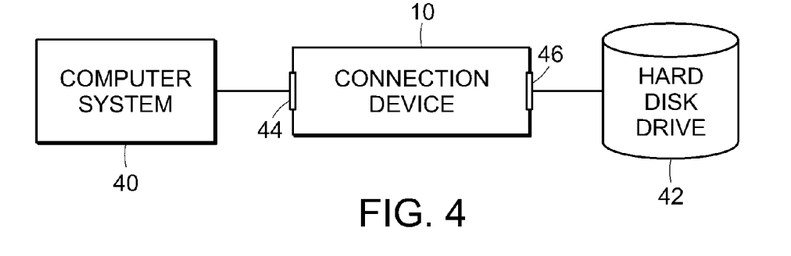
FIG. 4 is a schematic diagram of a typical system employing the connection device of FIG. 3.

Referring to FIG. 4, which is an example embodiment employing a Fibre Channel to SCSI brige, a computer system 40 is connected to the first input/output interface 31 (see FIG. 3) by a Fibre Channel connector 44. In this case, the first input/output interface 31 is a Fibre Channel interface. The computer system 40 is hereafter referred to as 'the initiator device'. A 'target device' in the form of a hard disk drive 42 is connected to the second input/output interface 32 (see FIG. 3) by a SCSI connector 46. In this case, the second input/output interface 32 is a SCSI interface. Only a Fibre Channel driver module 22 (see FIG. 2) is included in the first device driver layer 12 and only a SCSI device driver module 21 (see FIG. 2) is included in the second device driver layer 18.

Figure 5:
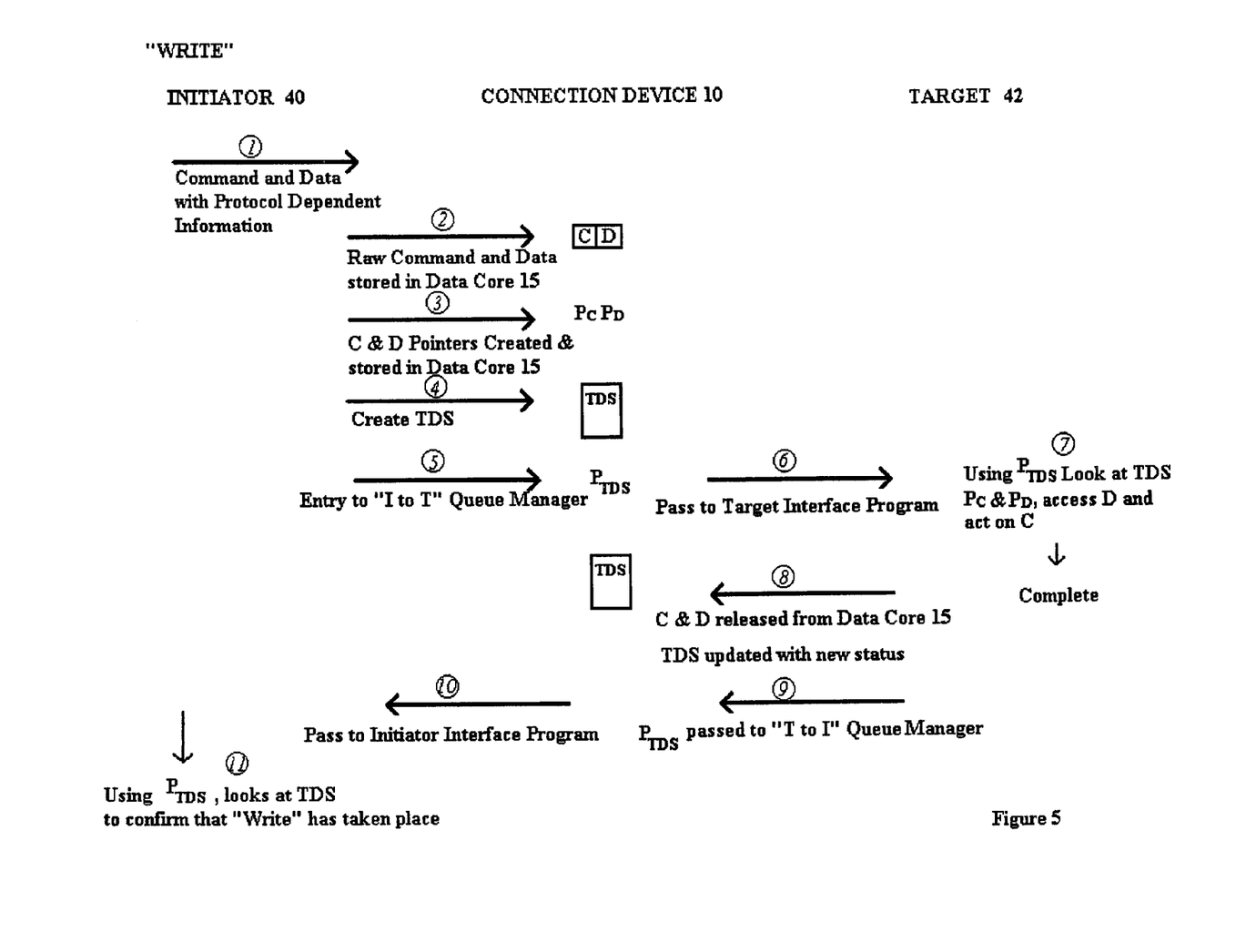
FIG. 5 is a flow diagram representing steps in a typical 'write' operation performed on the system shown in FIG. 4.

Referring to FIG. 5, the steps of a typical 'write' operation are illustrated. In a first step, the initiator device sends a 'write' command and data (intended to be written to the target device 42) to the first input/output interface 31 where it is transferred through the Fibre Channel driver module 22 to the first interface abstraction layer 13. As will be appreciated, at the first interface abstraction layer 13, protocol-dependent information in the command and data information is removed and, in the second step, raw data (indicated 'D') and command (indicated 'C') information is passed to the data core 15, i.e. the memory 36 shown in FIG. 3. The raw data (D) and command (C) information is allocated to a memory location by the memory controller 34 and, in a third step, pointers ($P_D$), ($P_C$) to the data and command information are also stored in the data core 15.

In a fourth step, a so-called Transaction Data Structure (TDS) is created and stored in the data core 15. The TDS comprises a set of parameters which defines the overall transaction to be performed over the data connection device 10. The parameters include (a) "Type" which defines the type of interface used, i.e. Fibre Channel is this case, (b) "Transaction ID" which is a unique identifier for the transaction, (c) "Host ID" which is a unique identifier for the initiator device, (d) "Session ID" which is a unique identifier relating to the session invoked by the initiator device, (e) "Transaction Size" which is the size of the data block, (f) "Transaction Status" which is the current status of the transaction, (g) "Transaction Command Pointer" which stores $P_C$, mentioned above, (h) "Initiator Message Control Pointer" (IMCP) which points to a message block in the initiator 40, (i) Status Block Pointer which points to a block of data storing status information, (j) "Status Length", which defines the length of the status block that the status block pointer points to, (k) "Software Support Layer Program" which determines whether any data manipulation needs to be performed on data stored in the data core 15, and what manipulation is required, (l) "Encryption Flag" which defines an encryption algorithm to be performed on data, if required, before re-transmission of the data e.g. back to the initiator device 40, and (m) "Compression Flag", which defines a compression algorithm to be performed on data, if required, before re-transmission of the data back to the initiator device.

Having created the TDS, in a fifth step, an entry is made to a so-called Initiator to Target ("I to T") Queue Manager which determines the timing or order of transactions being performed in the initiator to target direction. The entry made is a pointer ($P_{TDS}$) to the TDS.

In a sixth step, the I to T Queue Manager passes the pointer $P_{TDS}$ to a Target Interface Program which runs on the command and control module 20. In a seventh step, the Target Interface Program accesses the TDS in the data core 15 using the pointer $P_{TDS}$, accesses the raw command (C) and data (D) using the pointers ($P_D$), ($P_C$) and the TDS, and acts on the data (D) in accordance with the command (C). Thus, since the command (C) specifies a "write" operation, the raw data (D) is read from the data core 15 and then written to the target device 42. As will be appreciated, the raw data (D) passes through the second abstraction layer 16 to the SCSI device driver 21 such that SCSI type protocol information is added to the data which can therefore be transferred to the target device 42 connected to the second input/output interface 32.

Once the write operation is complete, in an eighth step, the memory area in the data core 15 is deallocated and the TDS is updated to reflect an updated "Transaction Status", i.e. indicating that the write operation has taken place. Next, in a ninth step, $P_{TDS}$ is passed back to a so-called Target to Initiator ("T to I") Queue Manager, maintained in the command and control module 20, which determines the timing or order of transactions being performed in the target to initiator direction. In a tenth step, the T to I Queue Manager passes the $P_{TDS}$ to an Initiator Interface Program which runs in the command and control module 20. In an eleventh step, the Initiator Interface Program accesses the TDS using the pointer $P_{TDS}$ and determines whether a successful write has taken place by examining the "Transaction Status". If so, 'write' operation is thus complete.

If an error is detected at the target device 42, or when the target requires status information to go back to the initiator device 40, an area of memory is allocated in the data core 15, and status data is written from the target device to the memory area. In a further step, the TDS is updated, to reflect the presence of the written status data, with updates to the status block pointer and the status length.

It will be noted that the overall operation involves no moving of the command and data information in the data core 15. In other words, the command and data information is able to be written from the initiator device 40 to the data core 15 of the connection device 10 (in raw form) without being moved elsewhere in the connection device 10. Similarly, the raw command and data information is written to the target device 42 (with protocol dependent information added) without being moved elsewhere in the connection device 10. Effectively, the entire 'write' operation is performed by controlled management of pointers to the raw command (C) and data (D) information and the TDS, and by suitable releasing and updating of the data core 15 and TDS. This requires minimal processing by the connection device and enables the operation to be performed rapidly and efficiently. The same principle of operation applies to many other operations.

Figure 6:
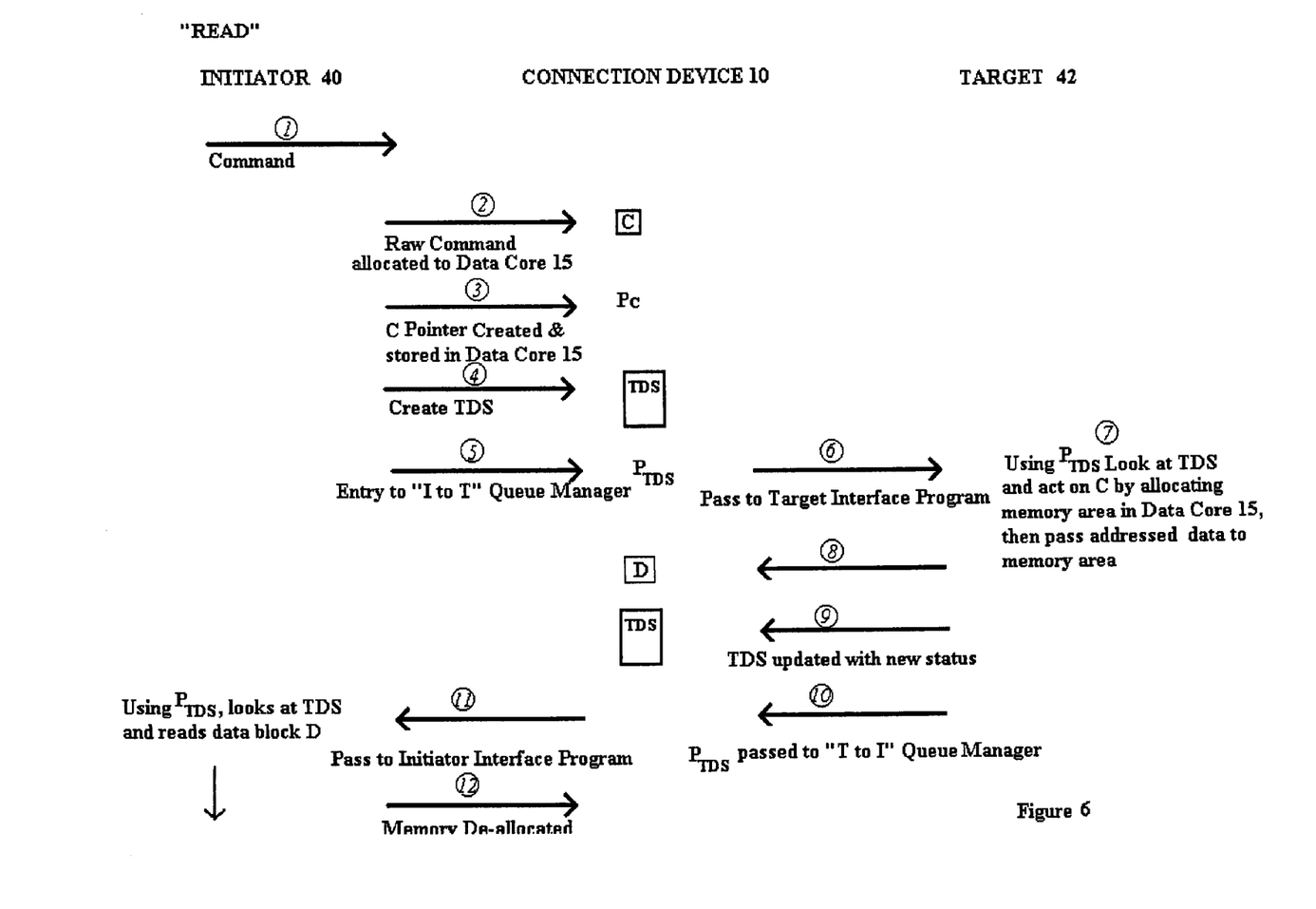
FIG. 6 is a flow diagram representing steps in a typical 'read' operation performed on the system shown in FIG. 4.

Referring now to FIG. 6, the steps of a typical 'read' operation are illustrated. In a first step, the initiator device sends a 'read' command (including the address of the data to be read from the target device 42) to the first input/output interface 31 where it is transferred through the Fibre Channel driver module 22 to the first interface abstraction layer 13. As will be appreciated, at the first interface abstraction layer 13, protocol-dependent information in the command information is removed and, in a second step, raw command (C) information is passed to the data core 15, i.e. the memory 36 shown in FIG. 2. The raw command (C) information is allocated to a memory location by the memory controller 34 and, in a third step, a pointer ($P_C$) to the command information is stored in the data core 15.

In a fourth step, a TDS is created and stored in the data core 15. As with the 'write' operation described above, the TDS comprises a set of parameters which defines the overall transaction to be performed over the data connection device 10.

Having created the TDS, in a fifth step, an entry is made to the Initiator to Target ("I to T") Queue Manager which determines the timing or order of transactions being performed in the initiator to target direction. The entry made is a pointer ($P_{TDS}$) to the TDS.

In a sixth step, the I to T Queue Manager passes the pointer $P_{TDS}$ to the Target Interface Program which runs on the command and control module 20. In a seventh step, the Target Interface Program accesses the TDS in the data core 15 using the pointer $P_{TDS}$, accesses the raw command (C) information using the pointer ($P_C$) and the TDS, and acts in accordance with the command (C). Thus, since the command (C) specifies a "read" operation relating to a particular address in the target device 42, an area of memory in the data core 15 is allocated, and data stored in the target device 42 at the address specified in the command is written to the allocated memory area. This is performed in step eight. As will be appreciated, the data from the target device 42 will have SCSI-type protocol information associated with it, and so the second abstraction layer 16 will remove this protocol information so that raw data (D) is stored in the data core 15.

In a ninth step, the TDS is updated to reflect an updated "Transaction Status", i.e. indicating that raw data (D) information is present in the data core 15 and where it is stored. Next, in a tenth step, $P_{TDS}$ is passed back to the Target to Initiator ("T to I") Queue Manager which determines the timing or order of transactions being performed in the target to initiator direction. In an eleventh step, the T to I Queue Manager passes the $P_{TDS}$ to the Initiator Interface Program which accesses the TDS using the pointer $P_{TDS}$, accesses the raw data (D) from the data core 15 (the fact that the raw data is present and where it is stored being indicated in the TDS) and passes the raw data (D) to the initiator device. As will be appreciated, the raw data (D) passes through the first abstraction layer 13 and Fibre Channel device driver module 22 and so Fibre Channel-type protocol information is added to the raw data (D) so that it can be read by the target device 40. Finally, in step twelve, the memory area in the data core 15 is deallocated.

Again, it will be noted that the overall operation involves no movement of the incoming command and data information within the connection device 10. The entire 'read' operation is performed by controlled management of pointers to the raw information and the TDS, and by suitable releasing and updating of the data core and TDS, thus maximising the speed and efficiency of the connection device 10.

Figure 7:
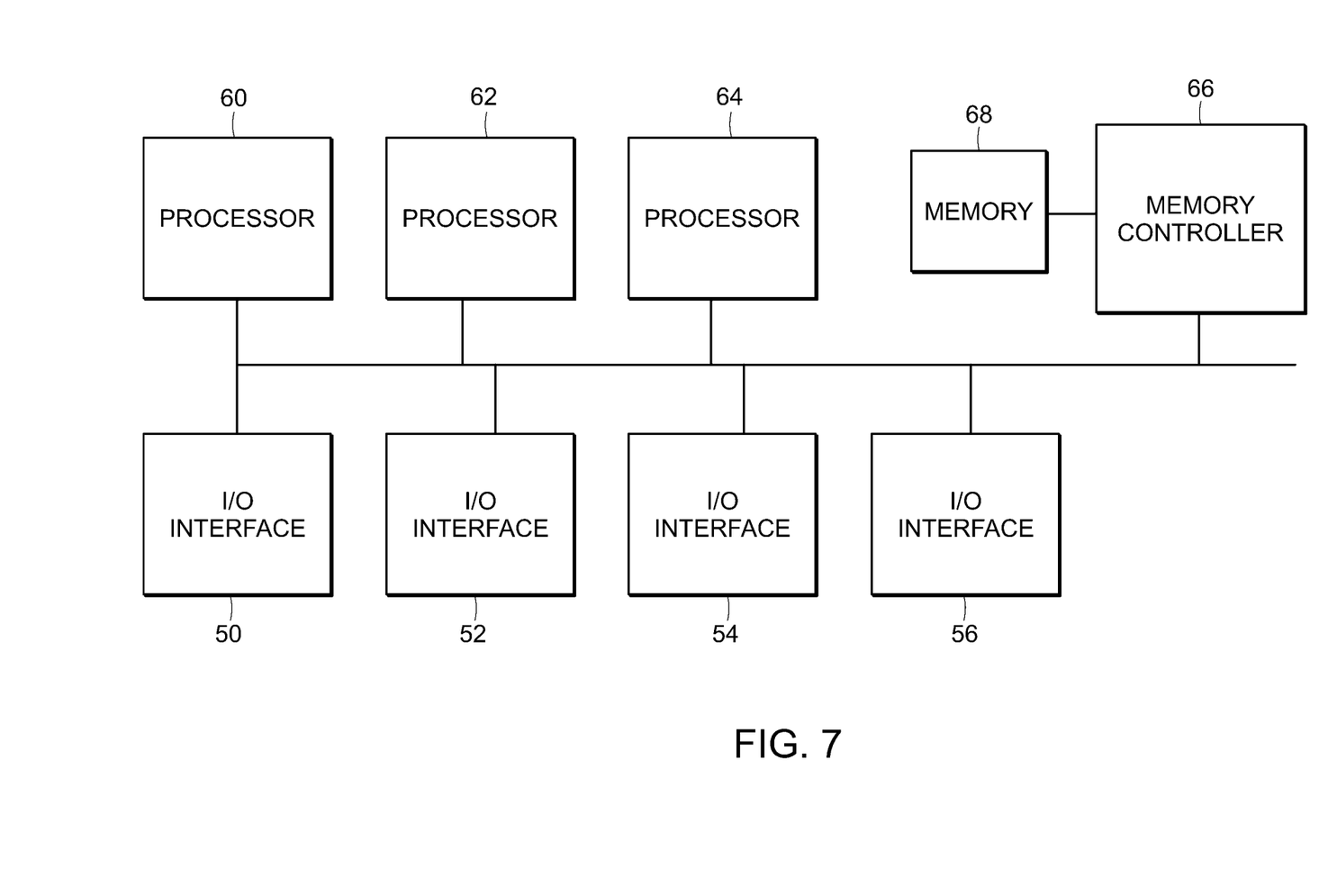
FIG. 7 is a schematic diagram representing the arrangement of components in a further connection device implementing the architecture shown in FIG. 2.

The fact that processing operations require no movement of data blocks stored in the data core 15 of the connection device 10 also provides for a scalable architecture which can be implemented to suit particular requirements. Since command and data information is stored in raw form within the data core 15 and is not moved, two, three or an even greater number of physical devices are able to access the same block of data. Of course, this requires suitable control of the queue managers and the TDS so that data corruption is avoided. As an example, FIG. 7 shows an alternative circuit implementation to that shown in FIG. 2. The alternative implementation comprises first to fourth input/output interfaces 50, 52, 54, 56, first to third processors 60, 62, 64, a memory controller 66, and a memory 68. The first to third processors can be arranged to act as the command and control module for one or more of the first to fourth input/output interfaces 50, 52, 54, 56. For example, the first processor 60 can act as the command and control module for the first input/output interface 50, the second processor 62 can act as the command and control module for the second input/output interface 52, and the third processor 64 can act as the command and control module for the third and fourth interface controllers 54, 56. Data processing operations (e.g. read/write operations) can be performed by accessing the memory 68, acting as the data core 15, via the memory controller 66 from any of the first to fourth input/output interfaces 50, 52, 54, 56 since the data stored in the memory 68 is raw (and so is not specific to any particular protocol) and is not moved. Suitable queue and pointer management enables the processing to be efficiently performed and data to be passed through any one or more of the input/output interfaces wherein protocol-dependent data is added.

As well as the relatively simple 'read' and 'write' operations mentioned above, there may be situations where data manipulation is required in the data core 15. This occurs when the "Software Support Layer Program" parameter of the TDS is flagged. In this case, the target device determines that this parameter is flagged and the data in the data core 15 is manipulated using the software support layer 14, 16 present in interface abstraction layer 13, 16. Access to the manipulated data is performed in the same way mentioned above in relation to the 'read' and 'write' operations.

Other types of data manipulation that may be performed on data blocks present in the data core are (i) data encryption and (ii) data compression. It will be apparent to persons skilled in the art what these processes generally relate to and involve. As mentioned previously, the TDS can comprise an "encryption flag" and a "compression flag", each of which defines an algorithm for manipulating stored data to perform, respectively, encryption of the data, and compression of the data. It will be appreciated that this form of data manipulation occurs as a result of a direct call from the TDS, rather than using a program forming one of the software support layers 14, 17 in one of the abstraction layers 13, 16 of the architecture.

In a further embodiment, the connection device 10 is a Fibre Channel to SCSI converter. Here, the first physical device 11 is a Fibre Channel interface, and includes a Fibre Channel connector (not shown), which in use is connected to an external device (not shown) having a Fibre Channel standard interface. Similarly, the second physical device 19 is a SCSI interface, and a SCSI connector (not shown) is connected to an external SCSI device (not shown). Only a Fibre Channel device driver module 22 is included in the first device driver layer 12, and only a SCSI device driver module 21 is included in the second device driver layer 18. Data flow in both directions is controlled by the data core 15.

In another embodiment, the connection device 10 has three SCSI interfaces (not shown), each of which is formed in the first physical device 11. In this embodiment, the first device driver layer only includes a single SCSI device driver module 21. The second interface abstraction layer 16, the second device driver layer 18 and the second physical device 19 are omitted. Data received at one of the SCSI interfaces is processed by the SCSI device driver 21 and by the interface abstraction layer as it is fed through to the data core 15. The data may be manipulated by the interface abstraction layer 13 as the data is fed back to one or both of the other SCSI interfaces. This data manipulation can be, for example, mirroring, in which the data is copied to both of the SCSI interfaces, or splicing, in which the data is divided between the SCSI interfaces. The device driver 21 handles the outgoing data as well as the incoming data. Three I/O controllers (not shown), one controller for each interface, are connected to the device driver module 21. These I/O controllers form part of the physical device 11.

What is claimed is:

1. A device for connecting at least two devices via interfaces, the device comprising in series: a first device driver module, which conforms to a first connection standard and which is arranged to operate with a first one of the interfaces and to provide a data and command output in response to data received at the first interface; an abstraction layer, which receives the data from the first device driver and provides protocol-free data and commands in response thereto; a data core which is arranged to receive the protocol-free data and commands and to provide data and commands in response thereto; a second abstraction layer, which is arranged to receive the data and commands from the data core and to provide protocol-containing data and commands in response thereto; and a second device driver module, which conforms to a second connection standard and which is arranged to receive the protocol-containing data and commands and to operate with a second one of the interfaces to provide data and commands conforming to the second connection standard thereat.

2. A device as claimed in claim 1, in which the first and second connection standards are different standards.

3. A device according to claim 2, wherein the first and second interfaces are configured to be programmable so as to enable the storing of information defining the at least one connection protocol to which that respective interface conforms.

4. A device according to claim 1, wherein the first abstraction layer is further arranged to receive protocol-free data from the data core memory, and to output converted data to the first interface, the converted data conforming to the first connection standard.

5. A device according to claim 1, wherein the second abstraction layer is further arranged to receive the data from the second device driver and provides protocol-free data and commands to the data core in response thereto.

6. A device according to claim 1, wherein, in use, the device is operable such that, after protocol-free data is stored in the data core memory, the device is arranged to generate at least one pointer referencing the up-to-date address of the data, the at least one pointer being accessible to data devices connected to at least one of the connection interfaces such that the protocol-free data can be identified and read by the data devices via the abstraction layer associated with the at least one connection interface.

7. A device according to claim 1, wherein the device is further operable to generate a status register defining an up-to-date status of a processing operation being performed on protocol-free data stored in the data core memory.

8. A device according to claim 7, wherein the device is further operable to generate a pointer to the status register, the status register pointer being accessible to a target interface program connected to at least one of the connection interfaces such that the status register can be updated after a processing operation is performed.

9. A device according to claim 1, wherein the device is further operable to allocate a memory area in the data core in response to an error message, relating to a data processing operation, being received from a data device, the memory area being used hold status data relating to the error message for subsequent transmission to at least one further data device.

10. A device according to claim 1, wherein each abstraction layer comprises software support means for providing support for data manipulation carried out by the data core.

11. A device according to claim 1, wherein each abstraction layer comprises software support for effecting manipulation of the protocol free data in the data core memory in response to a data manipulation command being included in data received from a data device.

12. A device according to claim 1, wherein the connection interfaces are comprised by at least one of a SCSI driver, an ISCSI driver, a Fibre Channel driver, an ATM driver, an Infiniband driver, and a Gb Ethernet driver.

13. A connection device module comprising a printed circuit board upon which is arranged: a connection device for connecting at least two devices via interfaces, the device comprising in series: a first device driver module, which conforms to a first connection standard and which is arranged to operate with a first one of the interfaces and to provide a data and command output in response to data received at the first interface; an abstraction layer, which receives the data from the first device driver and provides protocol-free data and commands in response thereto; a data core which is arranged to receive the protocol-free data and commands and to provide data and commands in response thereto; a second abstraction layer, which is arranged to receive the data and commands from the data core and to provide protocol-containing data and commands in response thereto; and a second device driver module, which conforms to a second connection standard and which is arranged to receive the protocol-containing data and commands and to operate with a second one of the interfaces to provide data and commands conforming to the second connection standard thereat and a physical connector connected to each interface of the connection device.

* * * * *